Figure 1:
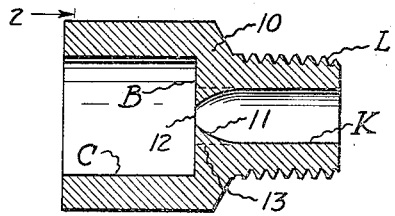

Oct. 19, 1943.  H. D. STECHER  2,332,353

METHOD OF MAKING TUBE COUPLING

Filed Oct. 2, 1941

INVENTOR.
HENRY D. STECHER
BY
ATTORNEYS.

Patented Oct. 19, 1943

2,332,353

UNITED STATES PATENT OFFICE 2,332,353

METHOD OF MAKING TUBE COUPLINGS

Henry D. Stecher, Lakewood, Ohio, assignor to The Weatherhead Company, Cleveland, Ohio, a corporation of Ohio Application October 2, 1941, Serial No. 413,266

8 Claims. (Cl. 29—157)

This invention relates to an improved method of making tube couplings of the inverted seat type of which the coupling contained in the Weatherhead Patent Number 1,733,925 is illustrative of one desirable form.

The prior art has long recognized the problem of making especially the female members of such couplings partly in that the desired tapping of the threads adjacent the inverted conical seat at the bottom of the threaded female cavity has been much encumbered by the presence of the conical seat therein during the tapping operation. Recourse has been had to hollow and recessed taps, multiple tapping operations and various other expedients, all of which have led directly or indirectly to excessive costs of manufacture and/or waste and breakage of tools or of material, particularly where coupling materials more difficult to machine are employed and in the larger sizes of couplings where deeper and heavier threads are sought to be formed. I am aware that the prior art has at times adopted the philosophies of despair in this respect in omitting all or part of the threads from the bottom of the female cavity adjacent the conical seat and/or enlarging the pitch diameter of the threads with respect to the base diameter of the seat. Both plans are wasteful of material in both coupling members since each leads to enlargements of internal and external coupling dimensions for a given size of tube to be coupled. Machining costs of course increase as machined areas and peripheries generally are increased.

More broadly speaking, the matter of forming the inverted seat in the base of the female cavity has constituted a problem in and of itself regardless of the extent of the threads near or remote from it and regardless of the tapping problem as such. The accepted practice in the prior art has involved the use of boring tools with recessed ends and cutting surfaces in which particularly the cutting edges required to enter and form the space adjacent the bottom of the cone are relatively weak, and this weakness is often reflected in increased costs in terms of time, tools and materials, particularly where materials more difficult to machine are sought to be employed.

It is among the objects of my invention to provide an improved method of forming the inverted seat in the bottom of the main cavity of the female member of a tube coupling, and of providing a coupling of superior physical characteristics in a more economical manner.

It is also among the objects of my invention to produce a coupling of the inverted seat type retaining all the advantages of compactness and economy inherent in the Weatherhead design and to provide a method for making such coupling stronger and more economically and from a wider choice of materials and in a wider range of sizes. In this way my objects include providing a method by which greater strength and other specific advantages incident to the selection of specific material may be obtained in the finished coupling and in which the difficulties which have militated against making such couplings are overcome.

Other objects include the provision of a female coupling member having an upset seat with the advantage of location of such a seat radially adjacent the threads at the bottom of the female cavity and possessing the added strength from the working and flow lines of and in the upset metal.

Figure 2:
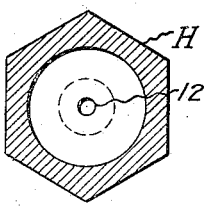
Figure 3:
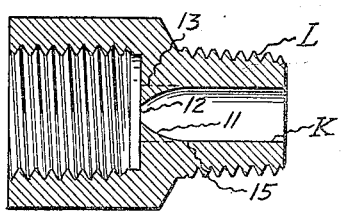
Figure 4:
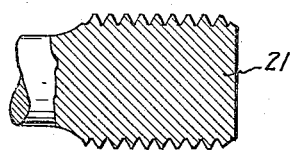
Figure 5:
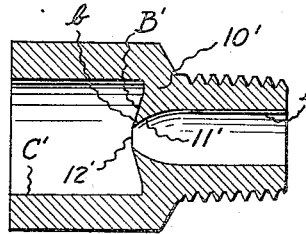
Figure 7:
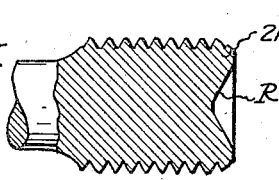
Figure 6:
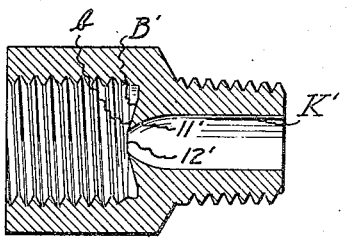
Figure 8:
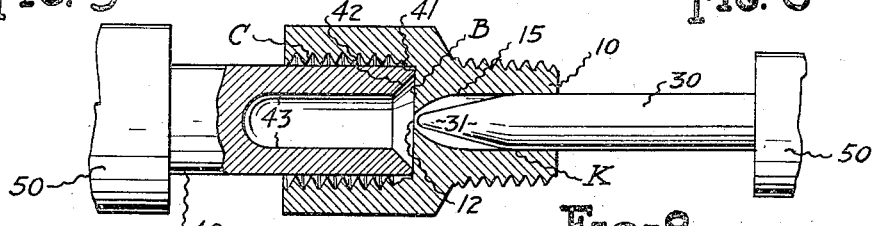
Figure 9:
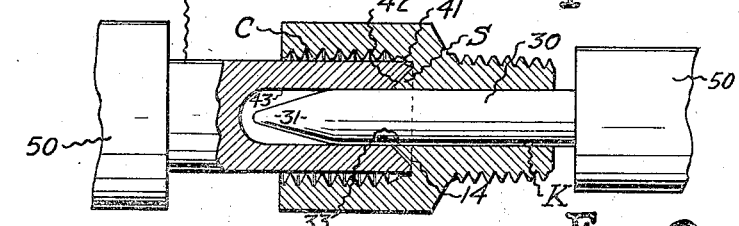
Figure 10:
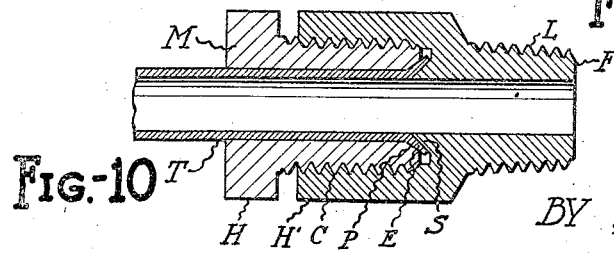

Other objects will appear from the following description of a preferred form of my invention, reference being had to the accompanying drawing, in which Figure 1 is a longitudinal cross sectional view of a female body member in a partially finished state; Figure 2 is an end view taken along the lines 2—2 of Figure 1; Figure 3 is a view similar to Figure 1 showing the threads tapped in the main cavity; Figure 4 is an illustrative sectional view of the cutting end of the tap adapted to be used in cutting the female threads shown in Figure 3; Figures 5 and 6 are views similar to those of Figures 1 and 3 respectively showing a modified form of the bottom of the main cavity of the female member; Figure 7 is a view of a modified form of tap similar to that of Figure 4 showing a recess in the leading face thereof corresponding to the configuration of the bottom of the cavity illustrated in Figures 5 and 6; Figure 8 illustrates the preliminary position of an illustrative pair of male and female dies preparatory to upsetting and forming the stock adjacent the bottom of the main female cavity to form the inverted seat therein; Figure 9 illustrates the relative position of the dies and coupling member of Figure 8 at or about the completion of the seat upsetting and forming stroke; Figure 10 illustrates the finished male and female coupling members in operative relation to each other and with the tube coupled between them.

In Figure 10 there is shown an illustrative form of the complete coupling to which my invention is directed. Such a coupling comprises a female member F having a threaded cavity C with an inverted conical seat S rising from the base of the cavity, which receives and supports the flared end E of a tube T. The tube T in turn passes through a male member or nut M externally threaded as shown to coact with the threads in the main cavity C of the female member. At its forward end the male member has a conically flared portion P adapted to bear upon and grip the flared end E of the tube T to secure the same in fluid-tight relationship as against the convex conical portion of the seat S. Externally the surfaces H of the male member and H' of the female member may conveniently be hexagonal, see Figure 2, or otherwise non-circular to conveniently be gripped by wrenches or the like to facilitate the screwing of the two members together. As shown in Figure 10 of the drawing herein the rearward portion of the female member here shown at the right in the drawing here may be merely externally threaded with pipe threads L for convenient assembly with the member or body to which the female member is sought to be joined as is well understood in the art. It is also well understood that this portion of the female member may take on any form or characteristic suitable for the particular purpose to which it is intended to be used and per se is without the objects of this invention.

As indicated above, my invention is particularly concerned with the formation of the female member of the coupling herein described, and particularly with the method which includes the steps of forming the inverted conical seat S therein in view of the known and recognized difficulties of forming the threads in the main cavity of the female member in the presence of the finished seat rising from the bottom of said cavity.

According to my method by appropriate steps familiar to those skilled in the art, and preferably with the use of hexagonal stock, as shown in Figure 2, I form the body 10 of the female member F with a main right cylindrical cavity C preferably flat bottomed as at B with an appropriate tap drill or boring tool. In conveniently timed relation with respect to that operation, I also form the external contour of the right portion of the body member 10 with the pipe threads L or otherwise as may be desired, and then form the secondary cavity K entering the right end of the body 10 and characterized particularly by its tapered walls 11 converging toward the orifice 12 in the bottom wall B of the major cavity C. Preferably in the forms herein illustrated the cavities C and K will lie along the same axis, and the internal diameter of the main portion of the cavity K will substantially correspond to the interior diameter of the tube T as shown in Figure 10. Although I have shown the tapering portions 11 of the cavity K of a particular and specific shape, the particular shape of taper may be varied more or less to accommodate different materials and variously desirable techniques of upsetting or spinning, my primary object being to provide an annular mass of material shown within the dotted lines at 13 substantially corresponding in volume to the mass of material comprising the finished inverted seats as at the left of the dotted line 14 lying in the plane of the base of the original cavity as shown in Figure 9. I prefer that the tapered walls 11 of the cavity K join the main cylindrical walls thereof without a substantially sharp break as at about 15, and I also prefer that the cavities C and K intersect to form the circular aperture 12 for purposes which will become more fully apparent as this description proceeds.

After the body 10 of the female member has been shaped as shown in Figure 1, I am thereafter able to form threads therein which extend substantially all the way to the base thereof by the use of a solid full headed tap 21, as shown for example in Figure 4, which has preferably but a limited angle of chamfer on the leading cutters, and I may if desired produce threads substantially corresponding in respect to the chamfer adjacent the bottom of the cavity C to that taught in the Weatherhead patent first above mentioned. In all events the threading of the cavity C, as shown in Figure 3, may proceed with a full bodied square ended tap, such as shown in Figure 4, without resort to any of the expedients or limitations otherwise made necessary by the presence of the inverted seat in the bottom of the cavity. In this way I am able to effect this tapping operation quite economically in a wide variety of desirable materials up to and including those which are very tough and very difficult to tap or machine, such as steel or Monel metal and the like, and which have been very costly to manufacture when the tapping is sought to be accomplished in the presence of a pre-formed seat in the base of the cavity.

After the female body 10 has been formed and threaded, as shown in Figure 3, the next step in my method is to upset the inner tapered end of the cavity K, displacing the material thereof, shown at 13 in Figure 1, upwardly from the bottom of the cavity C, or from right to left as shown in Figures 8 and 9, into the form of the finished inverted conical seat S, shown also at the left of the dotted line 14 in Figure 9. To illustrate an operative method of displacing or upsetting this material, I have shown in Figures 8 and 9 a male die member 30 having a rounded somewhat bullet shaped tapered head 31, and having an external diameter such as to closely but freely enter and be guided in the cylindrical part of the cavity K. An oppositely disposed female die member 40 preferably has a limited flat bearing area 41 bearing all around the outer edge of the bottom B of the main cavity C of the female member, and has a concave conical surface 42 disposed to define the finished conical surface of the upset seat to be formed, i. e., raised from the bottom of the cavity. The female die member 40 preferably has a central elongated cavity 43 adapted to freely yet closely receive the head 31 and adjacent shank of the male member 30 as shown in Figure 9. Preferably the external diameter of the female die member 40 which enters the threaded cavity C may substantially correspond to the tap drill diameter of the cavity to aid in the alignment of the female coupling member as well as to prevent such movement between the finished threads of the cavity and the adjacent walls of the die member 40, as might bring about an impact or injury to the threads during the upsetting operation.

The working portions of the male and female die members may be appropriately supported in enlarged shanks or bodies 50 carried and guided for aligned reciprocating motion toward and away from each other preferably in a vertical direction, although the horizontal position shown in the drawing is operable. The female body part 10 and die members being positionsed substantially as shown in Figure 8, the dies are forcibly moved toward each other, the male die advancing toward and into the femal die, and in the course of its movement first contacting the tapered walls 11 at the base of the cavity K, tending to expand those walls and displacing and upsetting the material around the tapered walls leftwardly, as shown in the drawing, and radially outwardly whereby to enter and substantially fill the annular conical recess 42 in the forward end of the female die 40. Preferably the male die will be forced to or toward the position shown in Figure 9 to the extent that the rounded head 31 thereof will have passed beyond the upset material of the finished seat so that the full cylindrical portion of the male die will enter and pass the through the bore of the finished seat as at 33 whereby to give a substantially cylindrical bore thereto substantially corresponding with and axially aligned with the cylindrical bore of the cavity K. Withdrawal of the dies from the body of the female coupling member may be facilitated with appropriate stops and/or ejectors according to well known practices not herein specifically illustrated. Meanwhile the female member of the coupling will have assumed its finished form as shown in Figures 9 and 10.

It will be seen that while the dies are advancing toward each other, that the coupling member F is supported on the annular surface 41 of the female member, and that as the material from the tapered bottom of the cavity K is being forced longitudinally and radially into the zone of the cavity C, this material will be caused to conform to the conical surface 42 of the female member so long as any of the material is resisting the entrance of the male member through the tapered bottom of the cavity K. In this way I obtain the effect of a coin press in forming the conical surface of the finished seat S.

It will also be seen that I prefer that the cavities C and K be machined substantially as shown in Figures 1 and 3 so as to communicate through a small orifice 12, the walls of which will, of course, be enlarged as the dies progress toward each other, and my preference is that this orifice be created by the intersections of the two cavities in the first instance, whereby to reduce the tendency of the metal to rupture during the upsetting operation. The particular confirmation of the orifice may vary from the theoretical circular line contour shown in the drawing here, as may also the character of the taper of the walls 11 in the base of the cavity K in relation to the shape of the head of the male die to accommodate materials of different upsetting or spinning characteristics as will be understood by those familiar with the upsetting and spinning arts. In referring to spinning I contemplate that a spinning tool shaped and positioned similarly to the die 30, but having a fluted head and given rotary as well as longitudinal motion, may be advanced through the cavity K as shown in Figures 8 and 9, while the female body member is held substantially in the position shown and while the female die 40 functions in substantially the same way as above described. In this way the bottom of the cavity K is displaced into the zone of the cavity C and constrained within the contour of the conical recess 42 to form the seat S. I prefer that the shape of the heads of either the spinning tool or upsetting die in relation to their motion and the material of the coupling member be such as to minimize the tendency to shear the material of the tapered bottom of the cavity K from the adjacent body parts of the coupling and rather to cause it to "flow" radially outwardly and longitudinally to the left as seen in Figures 8 and 9, beginning its "flow" at or adjacent the central orifice 12.

In Figures 5, 6 and 7 I have illustrated a modification of the method hereinabove described in that I form the bottom wall B' of the cavity C' in the female body member 10' with its central portion raised somewhat from the flat bottom B of Figures 1 and 3, but short of the full height of the finished conical seat of Figures 9 and 10. It is within the contemplation of my method that it may be advantageous while drilling or boring the cavity C' to let the bottom wall B' have some central elevation, as at b, even at the expense of recessing the face of the tap 21', as at R, a more or less corresponding amount. In this way I avoid weakening the support for the leading cutters of the tap 21', particularly where the metal to be threaded responds more readily to a threading operation than it does to an upsetting operation. Thereafter my method follows the procedure described above in that the cavity K' will terminate with the tapered or rounded bottom 11', but the general disposition of the bottom 11' will be partially within and as a whole nearer to the zone of the cavity C' than in the form shown in Figures 1 and 3. The machined cavities C' and K' may communicate through an orifice 12' for the reasons above indicated and the upsetting of the rounded portion 11' and/or other displacement of the material thereof into the finished seat in and into the cavity C' may proceed in the same manner as above described with reference to Figures 8 and 9 with the similar results. It will be seen that the gross displacement of metal with the upsetting or spinning operation will be somewhat less in this form than in the form first above described, but that the advantage of permitting the tapping in the absence of the completely formed seat S in the female member will be retained, as will also be the advantage of strength, economy and accuracy of the upset and "coined" seat.

In Figure 5 I have shown a partially formed seat b of perhaps ⅔ final base diameter rising at about an angle of 20° from the radial plane of the bottom B'. This is suggested for illustration as against a finished seat of full base diameter to rise at a 45° angle as shown in Figures 9 and 10. It may be noted here that particularly this modified form of my invention may be advantageously employed where the height of the conical seat is to be made relatively great as, for example, the pitch of the cone may be reduced to about 30° from the axis thereof as contrasted with the 45° cone mentioned above and shown specifically in the drawing. It may also be noted that although I have mentioned machining the bottom of the cavity and forming the elevated central portion b by a machining operation, it may well be more advantageous at times to raise this central portion of the bottom of the cavity by a preliminary upsetting or displacement, then, if desired, carrying out the tapping operation and then following the tapping with a final upsetting and further displacement to completion of the finished conical seat. It will be appreciated that these and other variants upon and interplay among the steps of my method follow my primary teaching, and may be availed of by those skilled in the art with advantage to meet changing and particular conditions as they arise.

While I have mentioned the advantages of the practice of my method in connection with the use of materials which are relatively difficult to machine, it will also be appreciated that my method is advantageous in the use of a wide variety of materials, including such easily machined materials as leaded brass, since the facility of tapping can be increased and the strength of the finished conical seat be enhanced by the flow lines of the metal incident to the displacement and upsetting thereof.

I have also found that my invention is particularly advantageous in the manufacture of the larger size couplings even where the material employed is relatively easy to machine, in that in the larger sizes the diameter of the flared end of the tube to be coupled exceeds the diameter of the body of the tube by a smaller relative increment than is the case in smaller tubes. For this reason the radial component of the conical seats in the larger couplings bears a smaller proportionate relation to the main bore of the coupling (cavity K) with the result that a proportionately lesser radial displacement of metal is required in the upsetting of the seats according to this invention when employed in the larger size couplings. In other words, my teaching is that while my present invention is advantageous through a wide range of sizes and materials, I have found that its advantages may be particularly enjoyed in the manufacture of the larger coupling sizes (for example, one inch or greater) when using material more difficult to machine.

While I have referred to upsetting the material from the bottom of the cavities K and K' into the forms of seats in the cavities C and C' and while I prefer to perform this step by upsetting the metal while "cold" in a single stroke, my teaching comprehends the displacement of this material broadly from the zone of one cavity to the other while changing its configuration as above described, whether in one or more upsetting strokes "hot" or "cold," or by spinning or swedging or other equivalent steps. I do not mean to exclude intervening steps of annealing between partial steps of displacement in which the material might otherwise tend to become overworked or brittle. Although as above described, I prefer to finally finish the inverted seat S as by a coining effect through the concave conical face of the female die, I contemplate there may be instances where the upset or otherwise displaced seat may be finished by a subsequent coining stroke of the female die or by the use of a rotating finishing tool possibly combined with a reamer to also finish the bore through the seat.

While I have mentioned the advantages of threading the female cavity C prior to upsetting or otherwise raising all or part of the seat into that cavity, there are advantages to be gained from my method of forming the seat even when that step is wholly or partly performed prior to the threading operation. Where, for reasons perhaps other than those of compactness and economy, it is not desired to tap the cavity C below the highest point of the seat, it will be appreciated that my method of forming the seat may be employed with substantially equal advantage before as after the tapping operation.

It may well be noted that I prefer to form the female bodies from rod stock, in which it will be appreciated that the inner central portion or core is normally softer than the parts nearer the surface. In this I gain in two ways, first, the metal to be upset or displaced is softer and thus the more easily worked, and secondly, the metal so worked is thus strengthened and provides a stronger seat than would otherwise be available from stock similarly located in the core of the rod.

Although I have illustrated and described a preferred form of my invention and certain modifications thereof, and have mentioned certain advantages to be obtained from practicing my invention, other modifications and changes as well as other advantages will occur to those skilled in the art without departing from the spirit of my invention or the underlying teaching of this disclosure, and I do not care to be limited to the particular forms herein specifically illustrated and described or in any manner other than by the claims appended hereto.

I claim:

1. The method of making an inverted seat coupling member which consists in forming a cavity in said member, the bottom of which is flatter than the seat sought to be formed therein, forming an oppositely disposed tapered bottom cavity communicating with said first cavity, and forcibly displacing the material of said tapered bottom part of said second cavity into said first cavity.

2. The method of making an inverted seat coupling member which consists in forming a cavity in said member, the bottom of which is flatter than the seat to be formed therein, forming an oppositely disposed tapered bottom cavity, forcibly displacing the said tapered bottom part of said second cavity in the direction of said first cavity, and coincidentally forming said displaced material into said inverted seat.

3. The method of making an inverted seat coupling member which consists in forming a cavity in said member leaving a bottom near the mid-portion thereof, forming an oppositely disposed coaxially extending cavity with an inwardly rounded bottom adjacent said first named bottom, threading the side walls of said first named cavity substantially all the way to the bottom thereof, supporting said member upon the peripheral margin of the bottom of said first cavity, and upsetting the rounded bottom of said second cavity into the zone of said first named cavity into the form of an inverted conical seat rising from the bottom thereof.

4. The method of making an inverted seat coupling member which consists in forming a substantially right cylindrical flat bottomed cavity in said member, forming an oppositely disposed coaxially extending cylindrical cavity with an inwardly tapered concave bottom portion, the walls of which intersect the flat bottom of the first cavity to form a central circular aperture, threading the side walls of said first named cavity substantially all the way to the bottom thereof, displacing the material adjacent said aperture from the zone of the second cavity into the zone of said first named cavity, and forming said material into conical form rising from the bottom of said first cavity.

5. The method of making an inverted seat coupling member which consists in forming a bottomed cavity in said member, forming an oppositely disposed coaxially extending cavity with a concave bottom intersecting the bottom of the first cavity, threading the side walls of said first named cavity substantially all the way to the bottom thereof, upsetting the material adjacent the bottoms of said cavities and constraining the upset material into the form of a conical seat rising from the bottom of said first cavity.

6. The method of making a female coupling member of the inverted seat type which consists in forming a cavity in one end thereof with a substantially flat bottom, forming a second coaxial cavity oppositely disposed in said member, while leaving a surplus of material in the bottom of said second cavity adjacent the bottom of said first cavity, forcibly displacing the said surplus material from the bottom of the second cavity into said first cavity, and constraining the displacement of said material to the form of an inverted seat rising from the bottom of said first cavity.

7. The method of making a female coupling member of the inverted seat type which consists in forming a cylindrical substantially flat bottom cavity in said member, forming the portion of said member adjacent and longitudinally opposite the mid-portion of the bottom of said cavity to contain a surplus of material disposed outside the confines of said cavity, threading the side walls of said cavity substantially all the way to the bottom thereof, upsetting the said material adjacent the bottom of said cavity from its location outside said cavity into the zone thereof, and constraining the upset material into the form of a conical seat rising into said cavity from the marginal portion of the bottom thereof.

8. The method of claim 5 in which the upset material is pierced to form a passage coextensive with said second named cavity opening into said first named cavity.

HENRY D. STECHER.